Figure 1:
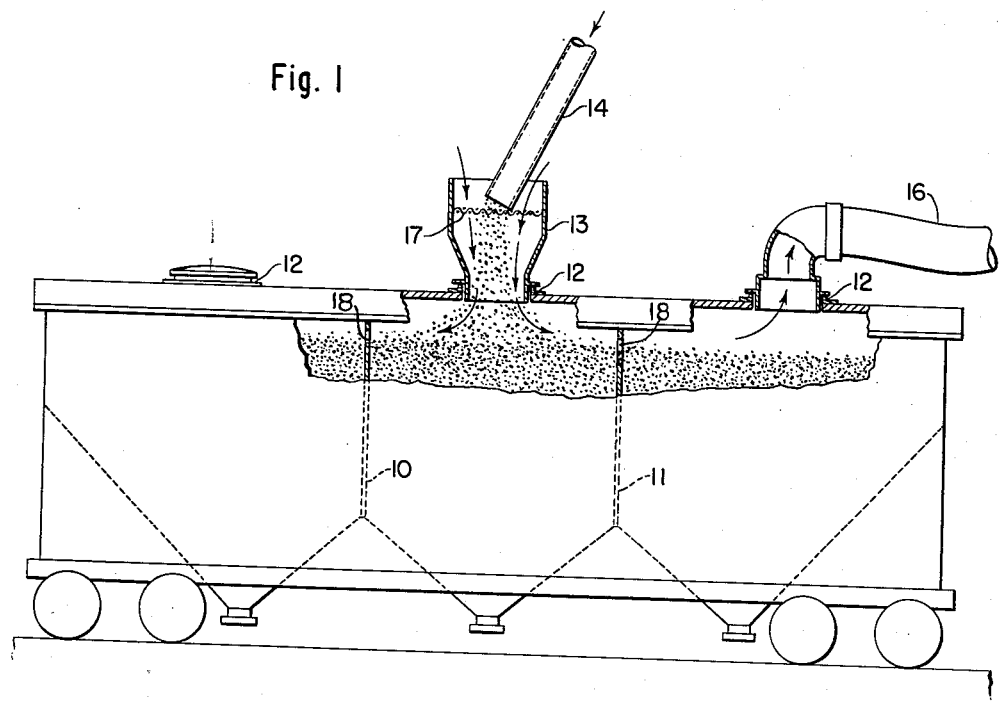

May 17, 1955

G. S. GRAY ET AL 2,708,542

PROCESS OF BULK LOADING FREE FLOWING MATERIALS

Filed Nov. 29, 1950

INVENTORS
GEORGE S. GRAY
HOMER H. HAHN

ATTORNEYS

United States Patent Office 2,708,542
Patented May 17, 1955

2,708,542
PROCESS OF BULK LOADING FREE FLOWING MATERIALS

George S. Gray and Homer H. Hahn, Pampa, Tex., assignors to Godfrey L. Cabot, Inc., Boston, Mass., a corporation of Massachusetts Application November 29, 1950, Serial No. 198,184

1 Claim. (Cl. 226—116)

This invention relates to the loading of free flowing solid materials and comprises an improved process for completely filling with such materials closed or covered containers having small loading ports.

Many free flowing materials are stored and transported in bulk. Typical of these are finely divided solids and agglomerated pigments such as carbon black pellets, and the like. Such materials are customarily stored and transported in completely enclosed containers to which access is usually obtained only through relatively small openings or ports.

When loading free flowing solids into a container through a loading port the particles do not flow or move like water to a level surface but gather into a cone below the loading port. Thus when the peak of the cone is at the level of the top of the container large void spaces remain within the body of the container.

Heretofore it has generally been the practice to provide means for conveying or pushing the material outwardly to the sides of the container, such as by blowers, conveyor belts, rams, articulated flat bladed hoes and the like. Such means are effective to a limited degree but where the material is friable and readily pulverizable, as is the case with carbon black pellets, for example, hoeing, pushing and tumbling breaks down large quantities of the material, destroying the pellets and creating a serious dust problem. When the loading is into the usual railroad covered hopper car any large quantity of dust will cause the entire load to stick and unloading the car becomes extremely laborious. Also, although pushing or blowing the material around fills part of the void space in the car it does not fill it all.

The importance of completely filling a container for transportation will readily be appreciated. Not only is a partially filled hopper car, tank truck, or ship an economic waste but also, where freight rates are scaled to minimum weight requirements, under-loading a conveyance may cost the shipper many hundreds of dollars.

It is the principal object of our invention to provide an efficient process of fully and easily loading free flowing friable materials into generally enclosed containers without damage to the material.

It is another object of our invention to provide a process of fully loading such free flowing materials into enclosed containers of large size through small openings or loading parts.

More especially it is an object of our invention to provide a novel process for loading carbon black pellets in tank cars without causing any significant breakage or dusting thereof and to accomplish that result faster and more economically than has heretofore been possible.

We accomplish these and other desirable results by conducting the material into the container through a conduit of somewhat lesser external diameter than the opening of the loading port and at the same time creating a partial vacuum within the container. The conduit extends through the loading port and has sufficient clearance from the wall of the port to permit the passage of air about the conduit into the container. We have found that with a vacuum of as little as four inches of water the inflowing material instead of piling up beneath the loading conduit will flow outwardly in all directions away therefrom under the gentle urging of the simultaneously inflowing air. The material will thus maintain a generally level surface while filling the container completely to the top.

The improvement over old methods of bulk loading fragile materials afforded by the process of our invention is evident. Both mechanical and pneumatic methods heretofore utilized are destructive of such materials in varying degree. All pneumatic methods heretofore known, so far as we are aware, utilize air or other gas as a carrier for the material, requiring relatively high flow velocities to propel the material into the container. At those high velocities the incidence of collision between the particles is high, resulting in substantial breakage of friable material. The process of our invention, on the other hand, is very gentle, so that when loading such a brittle and friable material as carbon black pellets, for example, very little destruction of the pellets occurs.

We have used the process of our invention with spectacular success in the loading of railroad covered hopper cars with carbon black pellets which, it is well-known, are easily broken down even with only moderately rough handling.

The usual hopper cars for transporting carbon black and other pigment pellets and the like are completely covered and are provided in the top with a number of ports at spaced distances from one another. Such cars are also usually compartmented to facilitate loading and unloading. Because, as we have said, of the failure of the solid particles to level themselves within the container, a large number of ports are required to permit anything like complete loading. Hence, to introduce the loading spout into each of numerous ports, seriatim, generally requires that the car be moved each time or that the spout be articulated which is not generally desirable because of sticking and clogging. For instance, the usual hopper car used for carbon black transportation has some sixteen ports, eight on each side of the car, requiring that the car be moved eight times in the course of loading. And in spite of the large number of ports considerable manual labor with long-handled hoes is required to poke the materials into the remote areas of the container, thus consuming extra manpower and time.

In the practice of our invention we apply a hose or pipe connected to a source of vacuum to one of the loading ports or other convenient opening of the container. The loading spout is then introduced into any of the other ports, the spout being sufficiently smaller than the port to leave an open space between the outside of the spout and the edge of the loading port. All of the other ports and openings are advantageously secured against leakage although some leakage is not harmful provided pressure drop is maintained. Loading is then commenced and is continued until the container or each compartment thereof is full.

Figure 2:
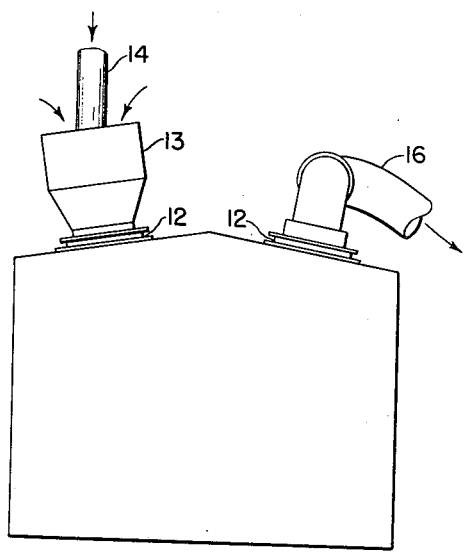

These and other characteristics of our process will be best understood and appreciated from the following description of a preferred manner of carrying it out as shown somewhat diagrammatically in the accompanying drawings, in which:

Fig. 1 is a view in elevation of a hopper car in process of loading showing a portion broken away, and Fig. 2 is a view in end elevation.

As herein shown, the car is divided by vertical partitions 10 and 11 into three compartments having hopper bottoms with discharge ports. In the top of the car are provided ports 12, two being shown as opening into each compartment and arranged side by side in spaced relation along the top of the car. The partitions 10 and 11 are apertured as indicated at 18 so that the entire contents of the car may be leveled off in filling while the partitions prevent bulk shifting of its contents in transit.

In loading a car of this character in accordance with our improved process, one of the ports 12 is opened and a funnel member 13 inserted therein. The discharge duct 14 is arranged concentrically within the funnel member and with clearance so that there is a free annular space about the duct 14 through which air may be drawn into the interior of the car. An exhaust tube 16 is now connected to another one of the ports 12 and through the medium of a vacuum pump, not shown, the pressure within the car is reduced to a partial vacuum of approximately 4" of water. Now when carbon black, specifically carbon black in the form of spherical granules, is delivered through the duct 14 into the car in an annular stream duct 14, air is drawn into the car in an annular stream surrounding the carbon black as delivered. The result is that instead of piling up in conical form beneath the delivery duct 14, the carbon black spreads throughout the compartment, and eventually throughout the car, to a substantially uniform depth. As herein shown the delivery duct 14 through which the carbon black is delivered by gravity terminates within the upper end of the funnel member 13. The precise position of the end of the duct is of secondary importance so long as the necessary clearance is provided about the end of the duct. If desired, a screen 17 of coarse mesh may be provided in the funnel member to prevent foreign articles from falling into the car.

The size of the container being loaded is not critical. An uncompartmented car, the hold of a ship, etc. can all be loaded through a single opening by the process of our invention.

Prior to our invention it was almost impossible with any amount of hoeing and pushing the carbon black pellets around to load a covered hopper car with certain types of black to the minimum weight required to obtain the benefit of low freight rates. Using the process of our invention, we have never found it impossible to load the car beyond the minimum specified weight and, in fact, on some occasions have succeeded in loading cars more heavily than they have ever been loaded before. In all cases we have succeeded in filling the cars and other containers substantially completely to the top.

Having thus disclosed our invention and described in detail a preferred manner of carrying it out, we claim as new and desire to secure by Letters Patent:

The process for loading friable free-flowing material into a hopper car having a plurality of spaced compartments and a loading port for each compartment for substantially completely filling the hopper car, which consists in providing communication between the compartments, providing a conduit which is sufficiently smaller in external diameter than any one of the ports to provide an open air space therebetween, inserting the conduit into one of the ports, flowing the material by gravity into the car through the conduit at atmospheric pressure so that air at atmospheric pressure will flow annularly through said open space within and around the material as it is being discharged from the conduit and into the car, and simultaneously maintaining the interior of the car at a pressure less than atmospheric by exhausting air from the car through another port.

References Cited in the file of this patent

UNITED STATES PATENTS

| | | |
|---|---|---|
| 1,149,844 | Lieber | Aug. 10, 1915 |
| 1,751,642 | Malmquist | Mar. 25, 1930 |
| 2,037,467 | Hapgood | Apr. 14, 1936 |
| 2,071,006 | Urschel | Feb. 16, 1937 |